Patented Nov. 26, 1935

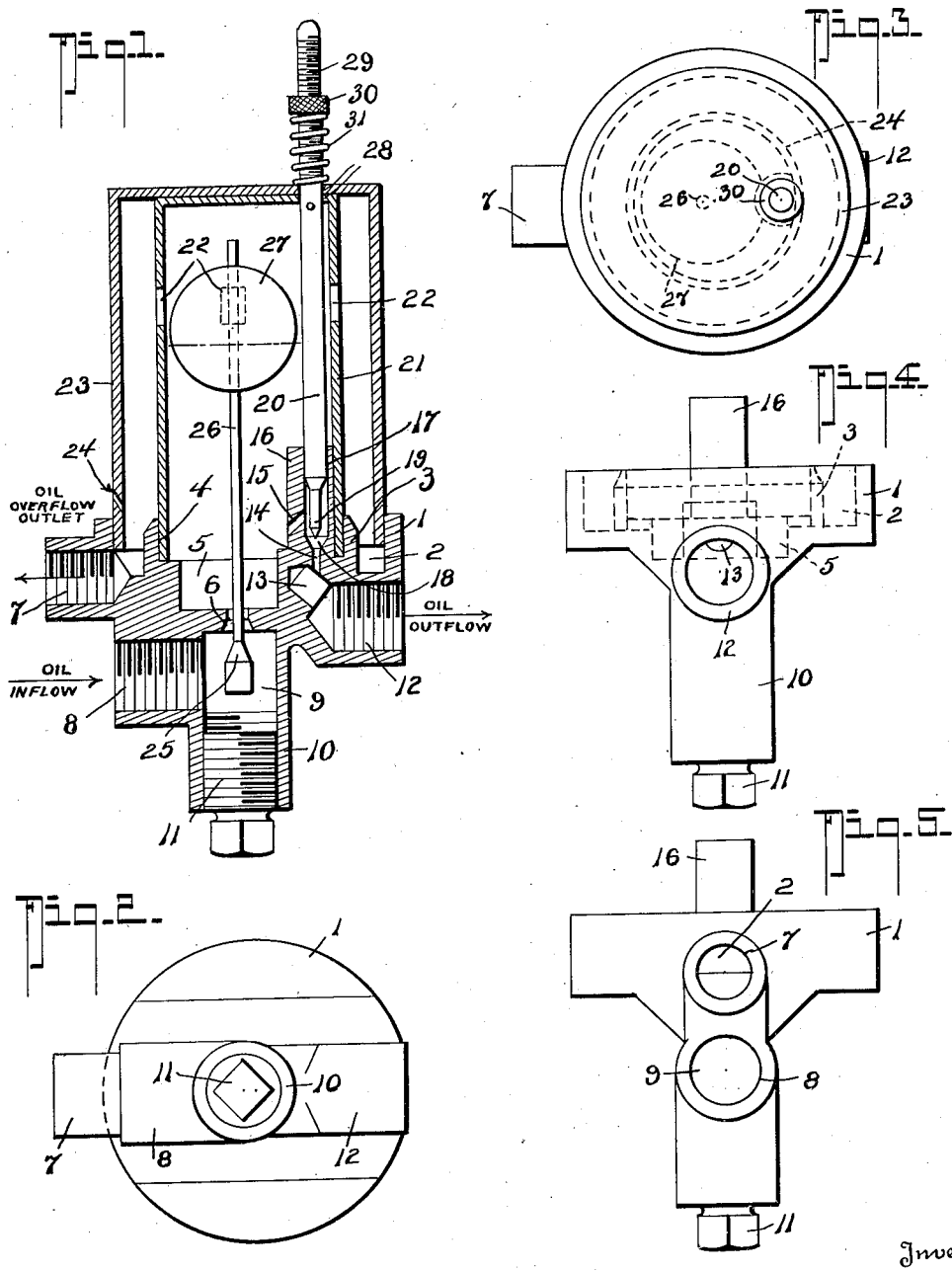

2,022,443

UNITED STATES PATENT OFFICE 2,022,443

LIQUID CONTROL APPARATUS

Walter C. Stollberg, Quincy, Ill.

Refiled for abandoned application Serial No. 672,899, May 25, 1933. This application December 17, 1934, Serial No. 757,975

8 Claims. (Cl. 137—68)

My invention has for an object to provide a non-siphoning overflow for oil in a float chamber that will not give off objectionable odors, thus rendering the invention particularly useful for controlling the flow of oil to domestic and other oil burners.

Further, it is an object of the invention to provide a liquid control apparatus whose float chamber is closed against escape of vapors or liquids and is so arranged that any vapors formed by heat will condense and then flow out through a suitable outlet or discharge channel to which a pipe or tube may be connected to convey the condensate away.

Further, it is an object to provide a liquid control having a float chamber surrounded by an overflow chamber, and a series of ports located in the wall of the float chamber at about the liquid level line and spaced around the axis of said chamber so that even though the device be tilted out of plumb the overflow will be taken care of regardless of the direction in which the device may be tilted.

Other objects will in part be obvious and in part be pointed out hereinafter.

To the attainment of the aforesaid objects and ends, the invention still further resides in the novel details of construction, combination and arrangement of parts, all of which will be first fully described in the detailed description, then be particularly pointed out in the appended claims, reference being had to the accompanying drawing, in which:—

Figure 1 is a central vertical longitudinal section of my invention.

Figure 2 is a bottom plan view thereof.

Figure 3 is a top plan view thereof.

Figure 4 is an elevation of the base unit looking from right to left in Figure 1.

Figure 5 is an elevation of the base unit looking from left to right in Figure 1.

In the drawing in which like numerals of reference indicate like parts in all of the figures, 1 is the base which is provided with a pair of annular flanges defining between them an overflow pocket 2. The inner flange 3 has a seat 4 to receive the cylinder or casing 21 which encloses the float chamber. The base 1 has a recess 5 forming a part of the float chamber and a passage provided with a valve seat 6 that communicates with a tubular projection 10 containing the oil receiving pocket 9 and a plug 11. Oil is conveyed to the pocket 9 through an intake 8 to which the oil supply pipe may be threaded.

The overflow oil or condensate from the pocket 2 passes out through an oil overflow outlet 7 to which a drain pipe may be threaded.

12 is the oil outlet opening of the base to which a delivery pipe may be threaded and 13 is an extension of the opening 12 to permit communication with the duct or passage 14 having a metering valve seat 18 through which the oil passes under control of the metering valve 19 whose stem 20 rides in a guide 16 having a bore 17 into which the oil is delivered through a port 15 from the float chamber. The metering valve, it will be observed, is located principally within the float chamber but passes through apertures 28 in the closed top of the cylinders or casings 21—23 and carries a spring 31 and milled nut 30 which is screwed onto the threaded portion 29 of the valve stem.

21 is the float valve cylinder or casing which is held in the base by tight-frictional engagement with the flange 3, and 23 is the overflow cylinder or casing which is held tight to the base 1 by the outer flange thereof, the cylinder or casing 23 having a small air vent 24 adjacent the base.

25 is the float valve which operates in pocket 9 and cooperates with seat 6, the stem 26 of this valve passing into the float chamber and carrying a suitable float 27.

22 designates a series of overflow ports in the casing 21 arranged in a plane normal to the axis thereof and at about the oil level or slightly above the same.

So far as described the manner in which the invention operates is best explained as follows:

Assume that the oil supply pipe is connected to the inlet 8, the plug 11 is in position to close the chamber 9 at its lower end, and assume the casing 21 to be filled with oil up to the proper level. Also assume that the outlet 12 is connected to the pipe that conveys the oil to the burner and that the metering valve has been properly set. When the parts are in this position oil flows from the inlet 8, through pocket 9, passage at 6, into the float chamber and from thence through port 15 into bore 17 and from thence through ports 14—13—12 to the pipe (not shown) that leads to the burner. Now, should, for any reason, an excess of oil flow into the float chamber it will drain out through one or another of the ports 22 and pass to the return outlet 7 or if, by reason of heat, vapor forms within the cylinders 21 and 23 the same will be condensed and gravitate down the walls thereof so as to pass out through the passage 7.

Since the float and overflow chambers are practically entirely closed there is little or no danger of odor being noticed at the outside of the apparatus since there is no place for odorous vapors to escape.

Furthermore, it will be noted that I provide a series of overflow ports 22 arranged in a circle around the axis of the float chamber. Thus if the apparatus in installed somewhat out of plumb it will make no difference in the operation since the overflow fluid will pass through the port 22 at the low side whichever that may be.

Again it will be observed that by placing the metering or regulating valve within the float chamber where the oil level and pressure is constant, I have provided for a more perfect operation of the apparatus. I am aware that in similar structures metering valves have been provided at one side outside of the float chamber and at more or less distance therefrom. This causes a variation in the action of the device at times due to the remoteness of the metering valve from the supply of liquid.

This application is a refiling of my application filed May 25, 1933, Serial No. 672,899, allowed September 12, 1933, but forfeited for non-payment of the final Government fee.

From the foregoing description, taken in connection with the accompanying drawing, it is thought the complete construction, operation and advantages of my invention will be clear to those skilled in the art.

What I claim is:

1. In apparatus of the character described, a base having an oil receiving recess and an overflow chamber and a recess for the reception of a float chamber casing, a float chamber casing closed at the top and having its lower end set in said last named recess, a second casing enclosing the first and set into said base to cooperate with the overflow chamber thereof, a metering valve housing in said float chamber, said housing having an oil duct from said oil receiving recess to the interior of said valve housing and having an oil duct from the interior of said valve housing to a discharge port of the base, said last named oil duct having a metering valve seat, a metering valve located in said housing and having a stem located in said float chamber and extending through apertures in the top of said casings, said base having an oil receiving chamber and a duct with a valve seat between said oil receiving chamber and said recess, a float valve in said oil receiving chamber and having a stem extended into said float chamber and carrying therein a float, said float chamber having a set of overflow outlets in its wall, substantially as shown and described.

2. In liquid control apparatus, a base, a float chamber cylinder carried by said base, an overflow chamber cylinder enclosing the float chamber cylinder and spaced therefrom and also carried by said base, said base having a float-valve controlled oil inflow passage to the float chamber, said float chamber cylinder having a plurality of overflow ports arranged in a circle around its axis and discharging into said overflow chamber cylinder, said base having an overflow outlet and duct in communication with said overflow chamber cylinder, said base having an outlet duct.

3. In a liquid control apparatus, a base having two concentric flanges dividing it into a central recess and an annular chamber, said base having a depending tubular projection and a passage between the same and said recess, said passage having a valve seat, said base having an oil inflow passage to said projection, said base having an overflow outlet from said annular chamber, said base having a passage to effect communication between said recess and an oil discharge port in the base, cup-like casings concentrically disposed on the base and constituting separate chambers, the inner one of said separate chambers comprising a float chamber and the outer one comprising an overflow chamber, the inner casing having oil overflow ports at different points around its axis, and said outer casing having an air vent adjacent the base, substantially as shown and described.

4. In apparatus of the character described, a body having a float chamber, an inlet port to said float chamber, a float actuated valve controlling said inlet port, said body having an outlet from said float chamber, said float chamber having an overflow orifice, a casing enclosing said float chamber, said casing and said float chamber defining between them an overflow chamber with which said overflow orifice communicates, and an overflow outlet from said casing.

5. In a liquid control apparatus, a base having a central inflow port, a float chamber cylinder carried on said base over said inflow port to receive liquid therefrom, said base having an outlet duct the entrance of which is within said float chamber cylinder, said float chamber cylinder having overflow ports located above said base, said base having an overflow receiving pocket surrounding said float chamber cylinder and having an overflow outlet from said pocket.

6. In a liquid control apparatus, a base having a central inflow port, a float chamber cylinder carried on said base over said inflow port to receive liquid therefrom, said base having an outlet duct the entrance of which is within said float chamber cylinder, said float chamber cylinder having overflow ports located above said base, said base having an overflow receiving pocket surrounding said float chamber cylinder and having an overflow outlet from said pocket, and a casing mounted on the base and surrounding said float chamber cylinder and spaced therefrom and defining with said float chamber cylinder an overflow chamber, said overflow chamber being located above and communicating with said overflow receiving pocket.

7. In a liquid control apparatus, a base having a central inflow port, a float chamber cylinder carried on said base over said inflow port to receive liquid therefrom, said base having an outlet duct the entrance of which is within said float chamber cylinder, said float chamber cylinder having overflow ports located above said base, said base having an overflow receiving pocket surrounding said float chamber cylinder and having an overflow outlet from said pocket, and a float actuated valve controlling said inflow port of said base.

8. In a liquid control apparatus, a base having a central inflow port, a float chamber cylinder carried on said base over said inflow port to receive liquid therefrom, said base having an outlet duct the entrance of which is within said float chamber cylinder, said float chamber cylinder having overflow ports located above said base, said base having an overflow receiving pocket surrounding said float chamber cylinder and having an overflow outlet from said pocket, and a casing mounted on the base and surrounding said float chamber cylinder and spaced therefrom and defining with said float chamber cylinder an overflow chamber, said overflow chamber being located above and communicating with said overflow receiving pocket, and a float actuated valve controlling said inflow port of said base.

WALTER C. STOLLBERG.